United States Patent
Mehta

(10) Patent No.: US 11,514,093 B2
(45) Date of Patent: Nov. 29, 2022

(54) METHOD AND SYSTEM FOR TECHNICAL LANGUAGE PROCESSING

(71) Applicant: InspiRD, Inc., Mission Viejo, CA (US)

(72) Inventor: Sandeep Mehta, Redondo Beach, CA (US)

(73) Assignee: INSPIRD, INC., Mission Viejo, CA (US)

( * ) Notice: Subject to any disclaimer, the term of this patent is extended or adjusted under 35 U.S.C. 154(b) by 240 days.

(21) Appl. No.: 16/864,060

(22) Filed: Apr. 30, 2020

(65) Prior Publication Data

US 2021/0240753 A1 Aug. 5, 2021

Related U.S. Application Data

(60) Provisional application No. 62/970,086, filed on Feb. 4, 2020.

(51) Int. Cl.
*G06F 16/33* (2019.01)
*G06F 40/284* (2020.01)
*G06F 16/338* (2019.01)

(52) U.S. Cl.
CPC ........ *G06F 16/3344* (2019.01); *G06F 16/338* (2019.01); *G06F 40/284* (2020.01)

(58) Field of Classification Search
CPC .................................................. G06F 16/3344
See application file for complete search history.

(56) References Cited

U.S. PATENT DOCUMENTS

2011/0270820 A1* 11/2011 Agarwal ................. G06F 16/31
707/E17.108
2017/0075877 A1* 3/2017 Lepeltier ............... G06F 40/117
(Continued)

OTHER PUBLICATIONS

Lan et al., "ALBERT: A Lite BERT for Self-supervised Learning of Language Representations", arXiv, Computation and Language, 2020, pp. 1-17, ICLR.
(Continued)

*Primary Examiner* — Van H Oberly
(74) *Attorney, Agent, or Firm* — Kumar Maheshwari

(57) ABSTRACT

Exemplary embodiments disclose a method, a computer program product, and a computer system for searching technical documents. Exemplary embodiments may include the use of lexicons to generate customized hash functions; utilizing customized hash functions to generate hashcodes of technical text in document repositories; building a database of hashcodes from the repository; utilizing the customized hash functions for generating a hashcode of a search query; and correlating the search hashcode with the hashcode database to produce search results. A computer-implemented method to search technical text includes constructing one or more base hash functions for generating hashcodes that represent semantic content of technical text and accessing one or more lexicons describing technical terminology. The method includes utilizing the one or more lexicons to create one or more customized hash functions from the one or more base hash functions to generate hashcodes that more accurately represent a semantic content of the technical terminology in the one or more lexicons compared to the base hash functions.

20 Claims, 8 Drawing Sheets

(56) References Cited

U.S. PATENT DOCUMENTS

2017/0220610 A1* 8/2017 Laethem ............... G06F 16/954
2021/0081849 A1* 3/2021 Mezaael ........ G06Q 10/063114

OTHER PUBLICATIONS

Liu et al., "RoBERTa: A Robustly Optimized BERT Pretraining Approach," Computation and Language, arXiv, Computation and Language, 2019, pp. 1-13.
Garg et al., "Kernelized Hashcode Representations for Relation Extraction," Proceedings of the AAAI Conference an Artificial Intelligence, 2019, pp. 6431 6440.
Wikipedia, "Natural Language Processing", 2020, pp. 1-11.
Garg et al., "Dialogue Modeling via Hash Functions: Applications to Psychotherapy," arXiv, Research Gate, 2019, pp. 1-13.
Devlin et al., "BERT: Pre-training of Deep Bidirectional Transformers for Language Understanding," arXIV, 2019, pp. 1-16.

\* cited by examiner

METHOD AND SYSTEM FOR TECHNICAL LANGUAGE PROCESSING

CROSS REFERENCES TO RELATED APPLICATIONS

This application claims the benefit of U.S. Provisional Patent Application No. 62/970,086, filed Feb. 4, 2020, entitled as "METHOD AND SYSTEM FOR TECHNICAL LANGUAGE PROCESSING", which is incorporated herein by reference in its entirety.

FIELD OF THE INVENTION

Embodiments relate generally to the field of semantic text search in repositories of technical text documents via hash functions and lexicons.

BACKGROUND

In an increasingly global economy, there is increasing competition for products and services. To survive in such an environment, organizations need to deliver new innovative products to the market. Delivering innovations to the market frequently requires searching of technical document repositories.

Regulatory approvals are required before organizations can deliver many products to the market. Approvals require searching tens of thousands of pages of regulatory documents to identify applicable regulatory criteria. These criteria need to be matched with evidence demonstrating compliance. Gathering this evidence requires searching technical documents and reports. Further, enterprises often need to search intellectual property repositories or technical publications to ensure novelty or value of new innovations.

Any industry, organization, or engineering discipline involved in delivering products to market may have specialized technical terminology with different semantic content for similar terms. The specialized technical terminologies in these documents forces searches to be manual, error-prone, time-consuming, and costly.

SUMMARY

Exemplary embodiments disclose a method, a computer program product, and a computer system for searching technical documents. Exemplary embodiments may include the usage of lexicons to construct customized hash functions; utilizing the customized hash functions to generate hashcodes of technical text in document repositories; building a database of hashcodes from the repository; utilizing the customized hash functions for generating a hashcode of a search query; and correlating the search hashcode with the hashcode database to produce search results.

In an exemplary embodiment, a computer-implemented method to search technical text includes constructing one or more base hash functions for generating hashcodes that represent semantic content of technical text. The method uses one or more lexicons describing technical terminology to create one or more customized hash functions from the one or more base hash functions. The customization generates hashcodes that more accurately represent the semantic content of the technical terminology in the one or more lexicons compared to the base hash functions. The method may further include parsing documents in a technical document repository into syntactic elements and utilizing the one or more of the customized hash functions to generate hashcodes for the syntactic elements and storing the hashcodes in a hashcode database. The method may further include accessing a search query and utilizing the one or more customized hash functions to generate a search hashcode for the search query. The method may further include correlating the search hashcode with the hashcode database and determining one or more search results. The method may further include displaying the one or more search results. The method may further include concatenating the hashcodes for the syntactic elements to generate an aggregate hashcode. The method may further include modifying the customized hash functions utilizing user feedback on the one or more search results. The method may further include using one or more computer translation tools to translate document repositories.

Another general aspect is a computer-implemented method for searching a technical documents repository including parsing the documents in the technical document repository into syntactic elements and constructing one or more hash functions for generating hashcodes that represent semantic content of technical text. The method includes utilizing the one or more hash functions to generate hashcodes for the syntactic elements and storing the hashcodes in a hashcode database and accessing a search query. The method includes utilizing the one or more hash functions to generate a search hashcode for the search query and correlating the search hashcode with the hashcode database and determining one or more search results. The method may further include utilizing the one or more lexicons to create one or more customized hash functions from the one or more base hash functions to generate hashcodes that more accurately represent a semantic content of the technical terminology in the one or more lexicons compared to the base hash functions. The method may further include displaying the one or more search results. The method may further include concatenating the hashcodes generated by the one or more of the hash functions to generate an aggregate hashcode. The method may further include modifying the one or more hash functions utilizing user feedback on the one or more search results. The method may further include using one or more computer translation tools to translate document repositories.

In an exemplary embodiment, a computer-program product for searching a technical documents repository includes one or more non-transitory computer-readable storage media and program instructions stored on the one or more non-transitory computer-readable storage media capable of performing a method that includes constructing one or more hash functions for generating hashcodes that represent semantic content of technical text and parsing the documents in the technical document repository into syntactic elements. The method includes utilizing the one or more hash functions to generate hashcodes of the syntactic elements and storing the hashcodes in a hashcode database. The method includes accessing a search query and utilizing the one or more hash functions to generate a search hashcode for the search query. The method may further include correlating the search hashcode with the hashcode database and determining one or more search results. The method may further include displaying one or more search results. The method may further include concatenating the hashcodes generated by the one or more of the hash functions to generate an aggregate hashcode. The method may further include collecting user feedback on the one or more search results and modifying the customized hash functions based on the user feedback. The method may further include using one or more computer translation tools to translate document repositories. The computer program product may further include one or more computer processors capable of executing the program instructions stored on the one or more computer-readable storage media.

BRIEF DESCRIPTION OF DRAWINGS

The following detailed description, given by way of example and not intended to limit the invention solely thereto, will best be appreciated in conjunction with the accompanying drawings, in which.

The drawings are merely schematic representations, not intended to portray specific parameters of the invention. The drawings are intended to depict only typical embodiments of the invention. In the drawings, like numbering represents like elements.

DETAILED DESCRIPTION

Figure 1:
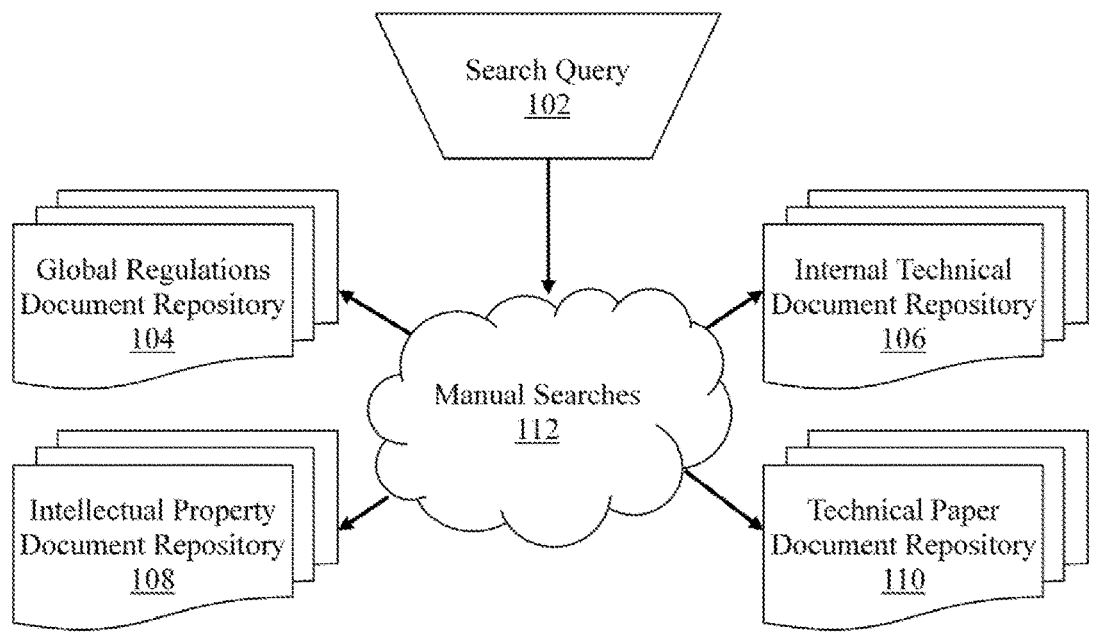
FIG. 1 illustrates a process for technical text searching, in accordance with the prior art.

FIG. 1 illustrates the need for technical language processing 100, in an enterprise engaged in delivering products and services to markets, in accordance with the prior art. Enterprises frequently need to query 102 repositories of technical documents to search for desired text.

Regulatory approvals are required for market access for enterprises in many industries such as aerospace, healthcare, automotive, life sciences, etc. Many different regulations may be applicable to a product: product use-related regulations, product components and materials-related regulations, engineering processes-related regulations, manufacturing processes-related regulations, testing and validation-related regulations, packaging and shipping-related regulations, etc. Many regulatory documents use specialized technical terminology, requiring enterprises to allocate significant resources to manually search 112 libraries of a global regulations document repository 104 to identify the regulatory criteria applicable to their products.

Regulatory approval requires generation of evidence that demonstrates that all applicable regulatory criteria are satisfied. Generation of evidence to support regulatory approval requires searching an internal technical document repository 106. At other times, enterprises need to search internal repositories of technical documents to access historical efforts. An organization and engineering discipline involved in product delivery may have a distinct specialized technical terminology. Hence, enterprises need to spend significant resources to manually search 112 internal technical document repositories 106 to identify applicable documents.

Additionally, enterprises need to search intellectual property document repositories 108 to ascertain novelty of their innovation and ensure that all related constraints have been addressed. Further, enterprises need to search a technical paper document repository 110 such as a repository of published technical literature to identify competing approaches or leverage work done by others. Since intellectual property document repositories 108 and technical paper document repositories 110 may use different specialized technical terminologies, manual search 112 is often required to find relevant information. Errors in technical text searches incur significant costs and have significant impact on product delivery and sometimes lead to market exit.

As will be described in greater detail below, the technical language processing method (FIGS. 2-4) and system (FIG. 5) can automate the laborious task of searching through technical documents across specialized terminologies and reduce the cost and schedule required to get product to market.

Figure 2:
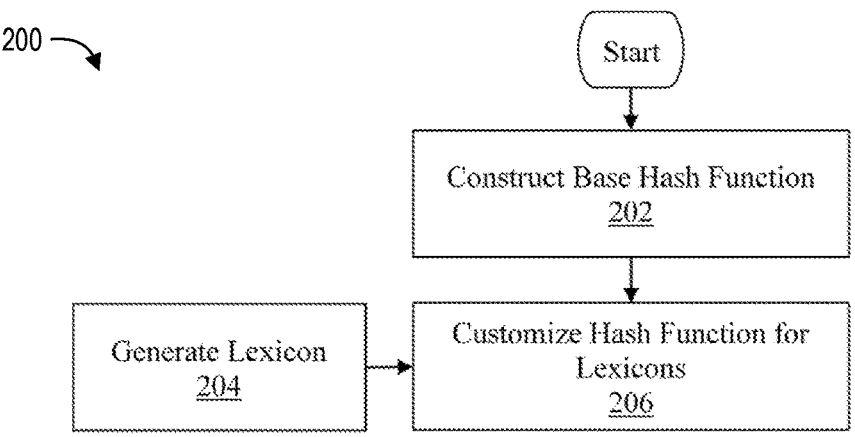
FIG. 2 is a flow diagram illustrating a method to construct a customized hash function in accordance with exemplary embodiments.
Figure 3:
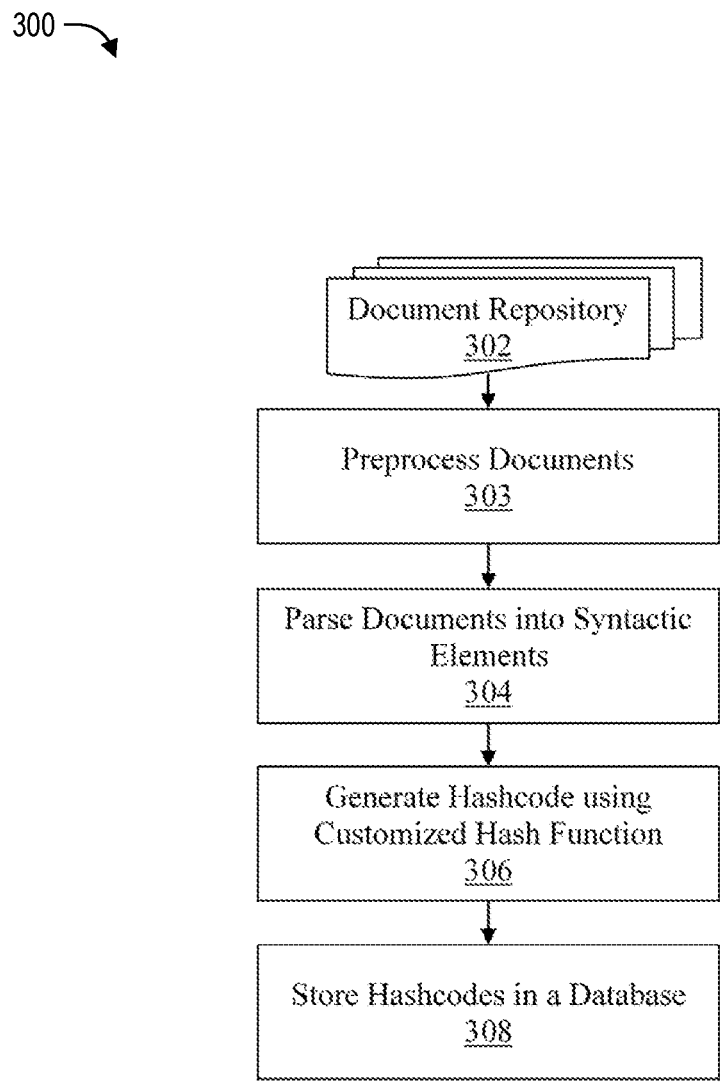
FIG. 3 is a flow diagram illustrating a method to generate a hashcode database for a document repository, in accordance with an embodiment of the invention.
Figure 4:
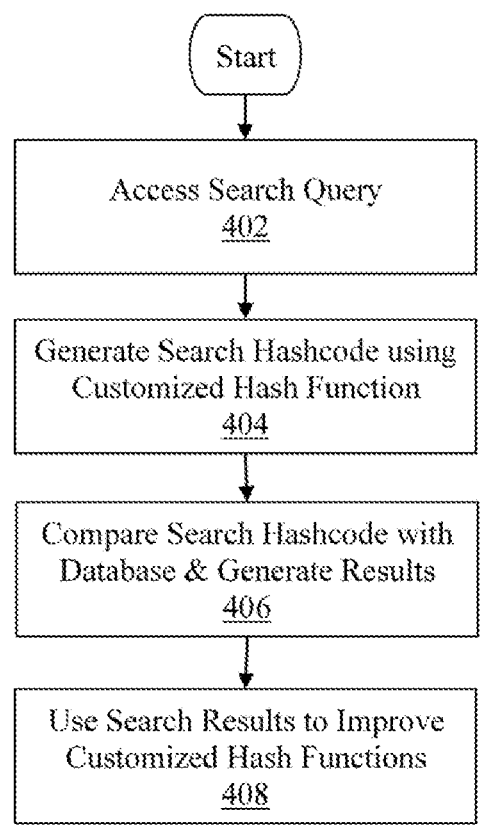
FIG. 4 is a flow diagram illustrating the method of operating the technical language processing system.

In accordance with embodiments of the present invention, FIG. 2-4 describe a method to search for technical text in technical document repositories addressing the fact that similar semantic content can be represented by different technical terms, or similar words may represent different technical meanings.

FIG. 2 depicts a method 200, in accordance with embodiments of the present invention to construct customized hash functions. A hash function generates a hashcode for technical text. Each element of the hashcode represents presence or absence of a semantic text pattern within the technical text. In an example embodiment, hashcodes are metadata representing the semantic text pattern within the technical text and hash functions are functions to generate the metadata. In another embodiment, the hashcodes can be seen as a vector representing the semantic pattern within the text. In yet another embodiment, hashcodes can be seen as a semantic index of the technical text. In another embodiment, hash functions can be seen as information retrieval functions, helping find text with matching semantic patterns.

While searching for an exact match for technical text is a hard problem as per the aforementioned reasons, inferring the presence of a generalized semantic text pattern within a technical document is relatively easier. The multi-bit hashcode representation is interpretable as well as useful for efficient search of technical documents.

The method starts with the construction of one or more base hash functions 202 for generating hashcodes that represent the semantic content of technical text. The base hash functions include learning models that generate hash codes such that text with similar inferred semantics are assigned similar hashcodes, and similar hash codes represent similar semantics. A base hash function 202 can include machine learning models such as Word Vectors, Bidirectional Encoder Representations from Transformers, Variational Auto Encoders (VAEs), Kernel Similarity Models, Locality Sensitive Hashing, or Neutral Networks, among others.

One or more lexicon documents 204 are used to broadly define technical terminology in use within an enterprise. In an example embodiment, a lexicon may contain technical terms followed by their definition. In another embodiment, a lexicon may contain a list of exemplary technical text pertaining to an industry or an enterprise. In another exemplary embodiment, a lexicon may contain technical terms along with user validated matches from document repositories.

While some lexicons may be available as a glossary of terms or taxonomies developed by industry organizations, others can be generated specifically to aid technical language processing. These lexicons can be generated for an industry, a segment within an industry, or a specific enterprise within an industry. Others may be generated for various processes such as engineering manufacturing, supply-chain management, packaging, etc. Other lexicons can be generated for engineering disciplines used in product development or scientific research. In another exemplary embodiment, lexicons may be generated for a technical repository.

A lexicon may be used in conjunction with the one or more base hash functions 202 to generate one or more customized hash functions 206 that more accurately represent the semantic content of different technical terminologies. In an example embodiment, customizing involves optimizing hash functions such that there is high mutual alignment between hashcode of terminology and the hashcodes of its explanation. In another embodiment, a semi-supervised approach can be used for customizing hash functions, where the technical text in lexicons is used to train the machine learning algorithms in the base hash functions and generate customized hash functions. In another example embodiment, methods such as Bayesian statistics are used to optimize base hash functions 202 and generate customized hash functions. In other embodiments, multiple base hash functions can be combined together to generate a single customized hash function. In another example embodiment, a locality sensitive hashing base hash function is customized by generating localities by clustering key phrases within a lexicon.

In an example embodiment of the invention, customization includes assembling hashcodes from multiple base hash functions together to generate one or more multi-bit hashcodes. Furthermore, the one or more multi-bit hashcodes are concatenated to generate an aggregate hashcode representing multiple semantic text patterns corresponding to the one or more lexicons and their underlying technical terminologies. Concatenation of multiple multi-bit hashcodes allows further optimization in technical language search across multiple enterprises and their specific technical terminologies.

A key motivation behind the invention is that while different words may be used to represent similar semantic text patterns across multiple documents, the customized hashcodes represent a generalized representation of semantics of the text within the repository. Another key motivation behind the invention is that while it is impractical to define a comprehensive and complete dictionary defining each technical term and all its variations used within an enterprise, a broad lexicon can help customize hash functions to effectively represent the semantic patterns within many different technical terminologies. Another key motivation of the invention is that the use of different lexicons can allow the invention to be customized for enterprises within different industries or enterprises with unique technical terminologies.

FIG. 3 depicts a method 300, in accordance with embodiments of the present invention to generate one or more databases of multi-bit hashcode representations of syntactic elements from one or more document repositories 302.

In an example embodiment, documents in the repository are accessed and preprocessed 303 to improve search accuracy. In other embodiments, a document may be translated into a standard electronic format before parsing. In other embodiments, optical character recognition or other approaches may be used to extract information from documents. In another embodiment, computer translation applications may be used to translate foreign language documents into English or vice versa.

In an example embodiment, a document in the document repository 302 is parsed 304 into its syntactic elements. The syntactic elements of a document may include chapters, sections, sub-sections, paragraphs, sentences, clauses, headings, titles, or labels, among others. Where the documents are in structured formats such as Adobe PDF or XML, and include syntactic definitions, parsing may involve direct extraction of the predefined syntactic structure. If the documents do not include predefined syntactic structure, machine learning applications such as neural networks may be used to parse the document and generate representative syntactic structure.

In an example embodiment, a multi-bit hashcode is generated 306 for syntactic elements using the customized hash function 206. These hashcodes are stored in one or more hashcode databases 308 and are available for technical text searching.

FIG. 4 depicts a method 400, in accordance with embodiments of the present invention to search for a Search Query 402. The Customized Hash Function 206 is used to generate a Search Hashcode 404. The Search Hashcode 404 is correlated with the hashcode database 308 to rapidly identify search results 406 as text elements that have matching semantic text patterns. In an exemplary embodiment, the correlation may involve computation of the Hamming Distance between a pair of hashcodes—representing the number of bit positions in which two bits are different. In another exemplary embodiment, the correlation may improve a matching of semantic vectors represented by hashcodes. In yet another embodiment, correlation may be seen as comparing metadata represented by hashcodes. In another embodiment, the correlation can be seen as using the index to compute correlation.

In an example embodiment, users of computer program product may provide feedback on accuracy of search results 406. A continuous learning loop is included to further optimize customized hash functions 206 based on user feedback of search results. In another embodiment, a user feedback on search may be used to train the machine learning functions in the customized hash functions 206.

Figure 5:
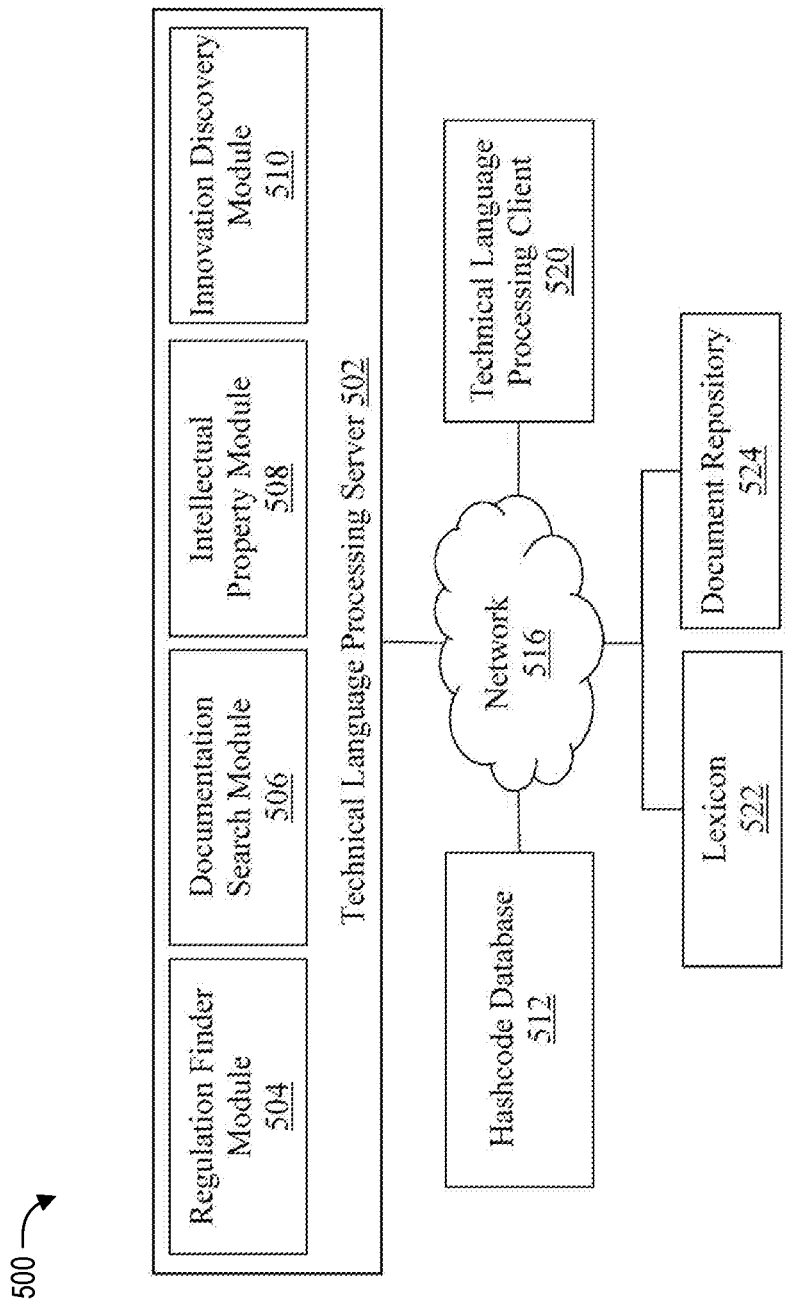
FIG. 5 provides a schematic representation of the technical language processing system, in accordance with exemplary embodiments.

In accordance with exemplary embodiments, FIG. 5 describes a computer program product, and system for technical language processing. Key benefits of the technical language processing system 500 include automated searching for applicable regulatory clauses in a global regulations document repository 104 for a given query 102. Similarly, the technical language processing system 500 can effectively search other document libraries such as the internal technical document repository 106, intellectual property document repository 108, or technical paper document repository 110, etc. These searches will incorporate semantic text patterns rather than just matching words.

In the example embodiment, the technical language processing system 500 may include one or more technical language processing servers 502, one or more technical language processing clients 520, one or more hashcode databases 512, one or more lexicons 522, and one or more document repositories 524, all interconnected via a network 516.

In the example embodiment, the technical language processing client 520 may act as a client in a client-server relationship and may be a software and/or hardware application capable of communicating with and providing a user interface to interact with a server via the network 516. In another embodiment, the technical language processing client 520 may run in a web browser.

In the example embodiment, the technical language processing server 502 may contain one or more modules providing different capabilities. In accordance with exemplary embodiments, the technical language processing server 502 may contain a regulation finder Module, a documentation search module 506, an intellectual property module 508, and an innovation discovery module 510.

In the example embodiment, a module (such as the regulation finder module 504, documentation search module 506, intellectual property module 508, and innovation discovery module 510) within the technical language processing server 502 may implement the method 200 for constructing customized hash functions using lexicons 522. In another embodiment, a module within the technical language processing server 502 may implement the method 300 to generate hashcodes for syntactic elements of a document in the document repository 524 and store the hashcodes into a hashcode database 512.

In another embodiment, a module within the technical language processing server 502 may implement the method 400 to access a search query from the technical language processing client 520, generate a search hashcode, compare the search hashcode with a hashcode database 512, and produce search results. In another exemplary embodiment, a module within the technical language processing server 502 may display search results on the technical language processing client 520. In another embodiment, a module within the server may access user feedback on search results from the technical language processing client 520. Furthermore, a module within the server may implement continuous learning functions and improve a customized hash function 408 based on user feedback.

Figure 6:
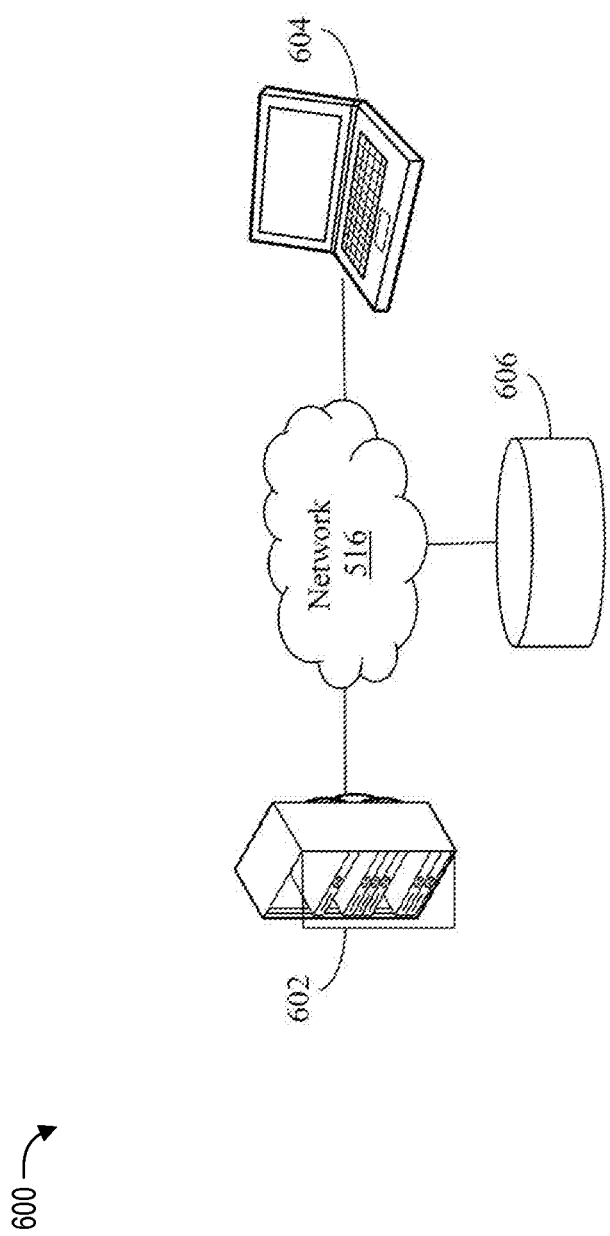
FIG. 6 provides a block diagram representing the hardware components of the technical language processing system, in accordance with the exemplary embodiments.

FIG. 6 depicts a block diagram 600 of the hardware components of the technical language processing system. In the example embodiment, the network 516 may be a communication channel capable of transferring data between connected devices. In the example embodiment, the network 516 is the Internet, representing a worldwide collection of networks and gateways to support communications between devices connected to the Internet.

Moreover, the network 516 may include, for example, wired, wireless, and/or fiber optic connections, which may be implemented as an intranet network, a local area network (LAN), a wide area network (WAN), or a combination thereof. In further embodiments, the network 516 may be a Bluetooth network, a WiFi network, or a combination thereof. In general, the network 516 can be any combination of connections and protocols that will support communications between connected devices.

In the example embodiment, server device 602 may include the technical language processing server 502 and may be an enterprise server, a server, a virtual device, a laptop computer, a notebook, a tablet computer, a netbook computer, a personal computer (PC), a desktop computer, a personal digital assistant (PDA), a smart phone, a mobile phone, or any other electronic device or computing system capable of receiving and sending data to and from other computing devices.

In the example embodiment, the client device 604 may include technical language processing client 520 and may be a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, or any other electronic device or computing system capable of receiving and sending data to and from other computing devices.

In the example embodiment, the computer storage medium 606 provides storage capability for the technical language processing system 500. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM), a static random access memory (SRAM), a portable compact disc read-only memory (CD-ROM), a digital versatile disk (DVD), a memory stick, or a Flash Memory device (SD Card). While the computer storage medium 606 is shown as a single device, in other embodiments, the storage can be a cluster or plurality of storage media, working together or working separately.

While the server device 602 and client device 604 are shown as single devices, in other embodiments, they may be comprised of a cluster or plurality of computing devices, working together or working separately. The server device 602 and client device 604 may contain one or more processors, such as microprocessors that execute program instructions, and means to access storage devices such as a computer storage medium 606 to load program instructions.

While in the example embodiment, programming and data of the present invention are stored and accessed remotely across server device 602, client device 604 and computer storage medium 606 via the network 516; in other embodiments, programming and data of the present invention may be stored or executed locally on as few as one physical computing device or amongst other computing devices than those depicted.

In exemplary embodiments, the technical language processing system 500 may be deployed using a cloud computing model. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. Hence, in the exemplary embodiment, the server device 602 and the computer storage medium 606 may be provided through cloud computing service.

In the example embodiment, the hashcode databases 512 may be a single database software instance. In other embodiments, multiple database software instances may be used. The data may be stored in and accessed from the computer storage medium 606.

In the example embodiment, the technical language processing system 500 may contain one or more lexicons 522. A lexicon may contain one or more documents in an electronic format such as HTML, Adobe PDF, Microsoft Word, Microsoft Excel, Plain Text, JSON, or XML, among others. The one or more lexicons data may be stored in and accessed from computer storage medium 606.

In the example embodiment, the technical language processing system 500 may contain one or more document repositories 524. A document repository may contain one or more documents such as regulatory documents, internal technical documents, intellectual property documents, technical papers, or other technical documents, among others. These documents may be in an electronic format such as HTML, Adobe PDF, Microsoft Word, Microsoft Excel, Plain Text, JSON, or XML, among others. The repository data may be stored in and accessed from a computer storage medium 606.

The technical language processing system 500 may be provided using Software as a Service (SaaS): the capability provided to the consumer is to use the provider's applications running on a cloud infrastructure. The applications are accessible from various client devices through a thin client interface such as a web browser (e.g., web-based email).

The present invention may be a system, a method, and/or a computer program product at any possible technical detail level of integration. The computer program product may include a computer readable storage medium (or media) having computer readable program instructions thereon for causing a processor to carry out aspects of the present invention.

Computer readable program instructions described herein can be downloaded to respective computing/processing devices (server device 602, client device 604) from a computer storage medium 606 or to an external computer or external storage device via a network 516. Computer readable program instructions for carrying out operations of the present invention may be assembler instructions, instruction-set-architecture (ISA) instructions, microcode, firmware instructions, state-setting data, or either source code or object code written in any combination of one or more programming languages such as Java, C++, JavaScript, or Python, among others.

Figure 7:
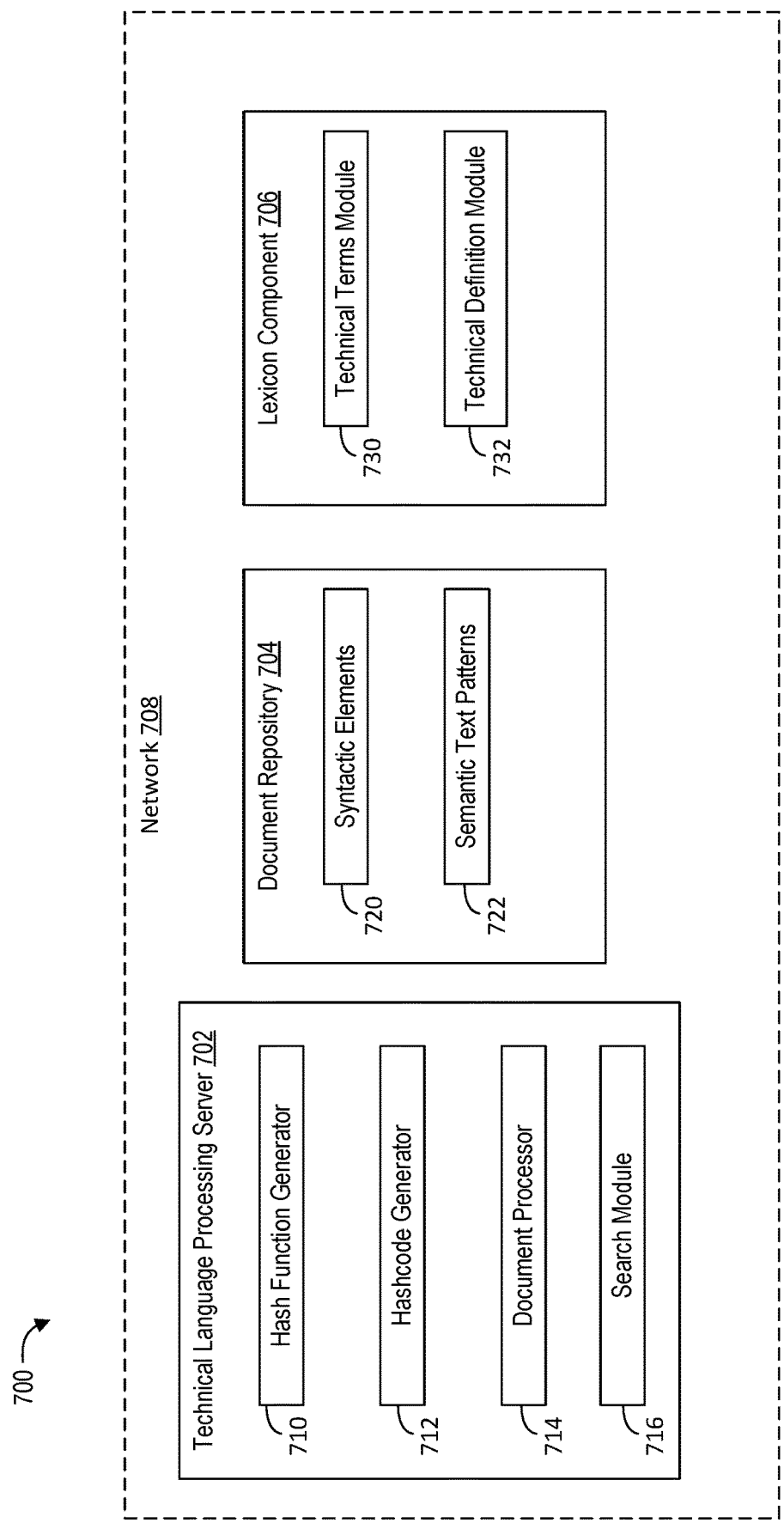
FIG. 7 is a schematic of a system for searching a technical documents repository that may be used in an embodiment of the disclosed subject matter.

Referring to FIG. 7, FIG. 7 is a schematic illustrating the components of an embodiment of a system 700 for searching a technical documents repository. The system 700 may include a technical language processing server 702, a document repository 704, and a lexicon component 706. The system 700 may be used to search repositories of technical documents.

The technical language processing server 702 may be a computer system with a processor, memory, and storage. The technical language processing server 702 may be interconnected to the document repository 704 and lexicon component 706 via a network 708. Computing operations, such as hash function generation, hashcode generation, document parsing, and searches may be performed by the technical language processing server 702. In various embodiments, the technical language processing server 702 may be a single computer system, a cloud-based computing system, a co-located computing system or the like. The technical language processing server 702 may include a hash function generator 710, a hashcode generator 712, a document processor 714, and a search module 716.

The hash function generator 710 creates hash functions that process textual information. Hash functions may operate on input to output a hash. The input may be any data. The hash may be an object or variable such as an integer value. In an example where the input is text, a hash function may project various combinations of text into output as integer values. The integer values may be stored in a hash table with an index.

The hash function generator 710 may start with a base hash function that categorizes text based on semantic text patterns. A semantic text pattern is a combination of one or more textual input variables that are categorized based on the meaning of the text. In one example, a natural language processing algorithm may be employed by a base hash function to recognize semantic text patterns. The natural language processing algorithm may be a machine learned algorithm that has been taught to recognize semantic text patterns. Various machine learning algorithms may be used to teach the natural language processing algorithm. In one example, the natural language processing algorithm may be taught via a neural network.

A neural network is a machine learning algorithm that comprises a multitude of nodes in an input layer, one or more hidden layers, and an output layer. The various layers are connected by synapses. Textual input data may be recorded as values in the input layer nodes. The value of the input layer nodes may be propagated through the hidden layers to the output layer by multiplying the value by a weight associated with each node. The weights of each node may be optimized such that the output values correspond to training data. The training data, in the case of natural language processing, may include text and a semantic meaning of the text.

Using a neural network, the natural language processing algorithm may be taught to recognize semantic text patterns. A base hash function may employ the natural language processing algorithm to create hashcodes for each semantic text pattern. The hash function generator 710 may optimize the base hash function to create a customized hash function. The customized hash function may be an optimized form of the base hash function. The hash function generator 710 may use various algorithms to optimize the base hash function. In one example, a neural network may be used to optimize the base hash function into the customized hash function. A document with technical definitions, such as a lexicon, may be used as training data to optimize the base hash function into a customized hash function.

The customized hash functions that are created by the hash function generator 710 may be employed by the hashcode generator 712 to create hashcodes. The hashcode may be a set of values and an index for the values. The values may be produced by the customized hash function. Multiple hashcodes may be concatenated by the hashcode generator 712 into an aggregate hashcode. The hashcode generator 712 may produce hashcodes based on text data that is provided by the document processor 714. Hashcodes produced by the hashcode generator 712 may be stored in the hashcode database 308 to be searched by the search module 716.

The document processor 714 may extract and process text data from documents. The document processor 714 may preprocess documents to convert the document into electronically readable text data. The documents may also be parsed into various syntactic elements by the document processor 714. The document processor 714, may provide the preprocessed and/or parsed document to the hashcode generator 712.

The search module 716 may analyze one or more hashcodes to effectuate a search based on textual elements of documents. In an example of the search module searching a document, the document processor 714 may preprocess and parse a text document. The hashcode generator 712 may create hashcode based on the preprocessed and parsed document. The search module 716 may compare the newly created hashcode to hashcodes in the hashcode database 308. The search module 716 may produce search results based on the comparison.

The document repository 704 is storage of one or more text documents. The text documents may be stored in various formats including electronic, paper, and audio formats. For example, the document repository may be a binder of text on multiple pages of paper. The text may be preprocessed by the document processor 714 into an electronically readable format. The document processor 714 may separate the text into syntactic elements 720. For instance, a document may be separated based on page divisions. The hashcode generator 712 may generate a hashcode that converts the text document into semantic text patterns 722. The semantic text patterns 722 may be customized based on the lexicon component 706.

The lexicon component 706 provides technical terminology by which the hash function generator 710 customizes hash functions. The lexicon component 706 may include a technical terms module 730 and a technical definition module 732. The technical terms module 730 may be a list of expressions that describe various technical terminology. The lexicon component 706 may include a technical definition module 732, which may be a list of textual expressions that define various technical terminology.

Figure 8:
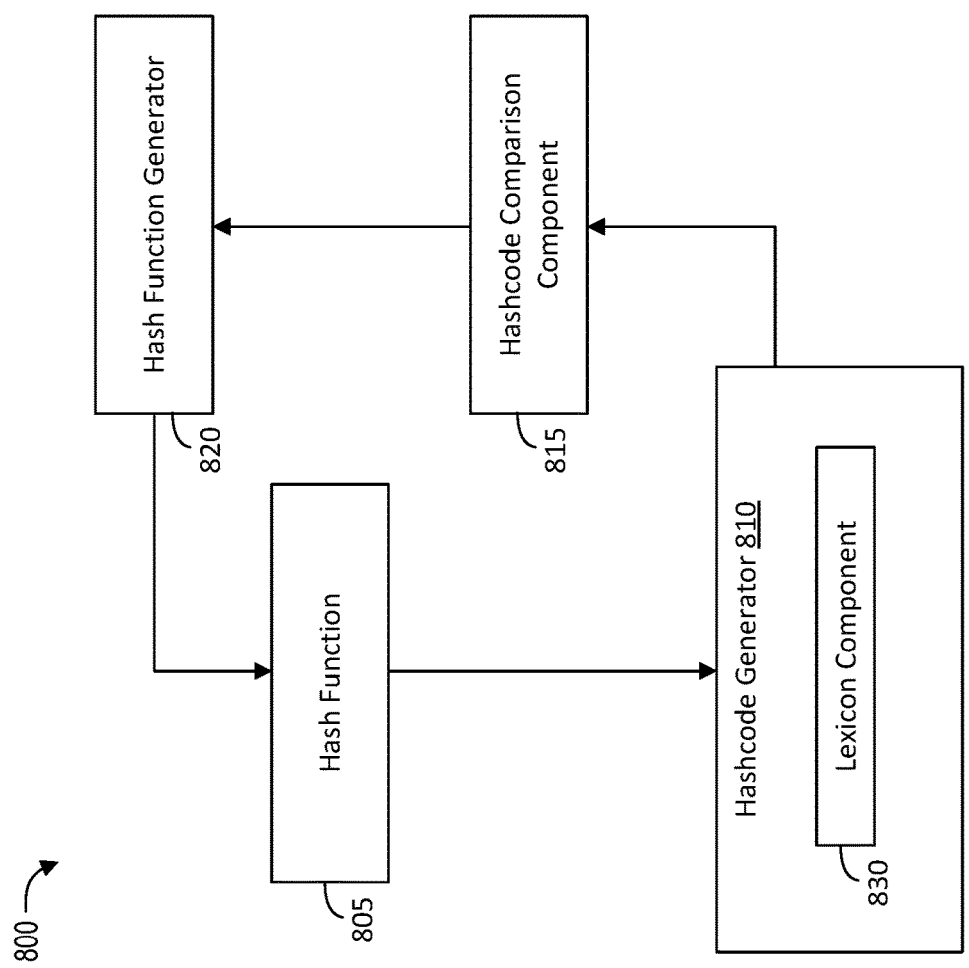
FIG. 8 is an illustration of the generation of a customized hash function in an embodiment of the disclosed subject matter.

Referring to FIG. 8, FIG. 8 is an illustration of a system 800 for optimization of a base hash function into a customized hash function. Hash functions may be customized to fit various technical terminology. The technical requirements of a search may determine how a hash function is customized. As shown by the recursive arrows, the system 800 may be repeated multiple times until a satisfactory hash function is generated.

The hash function 805 may be stored and/or created by the hash function generator 820. The hash function generator 820 may pass the hash function 805 to the hashcode generator 810 to generate a hashcode. A hashcode may be generated for one or more lexicon components 830. The lexicon component 830 may be a component with a technical terms module 730 that lists terminology and a technical definition module 732 that lists technical definitions. In an exemplary embodiment, the hashcode generator 810 may generate a hashcode for the technical terms module 730 and the technical definitions module 732.

The generated hashcodes may be compared by the hashcode comparison component 815. The hashcode comparison component 815 may determine a difference between the generated hashcodes of the technical terms module 730 and technical definitions module 732. Based on the difference, the hash function generator 820 may generate a new hash function that minimizes the difference that was determined by the hashcode comparison component 815. A machine learning algorithm such as a neural network may be used to generate the new hash function based on the comparison.

Figure 9:
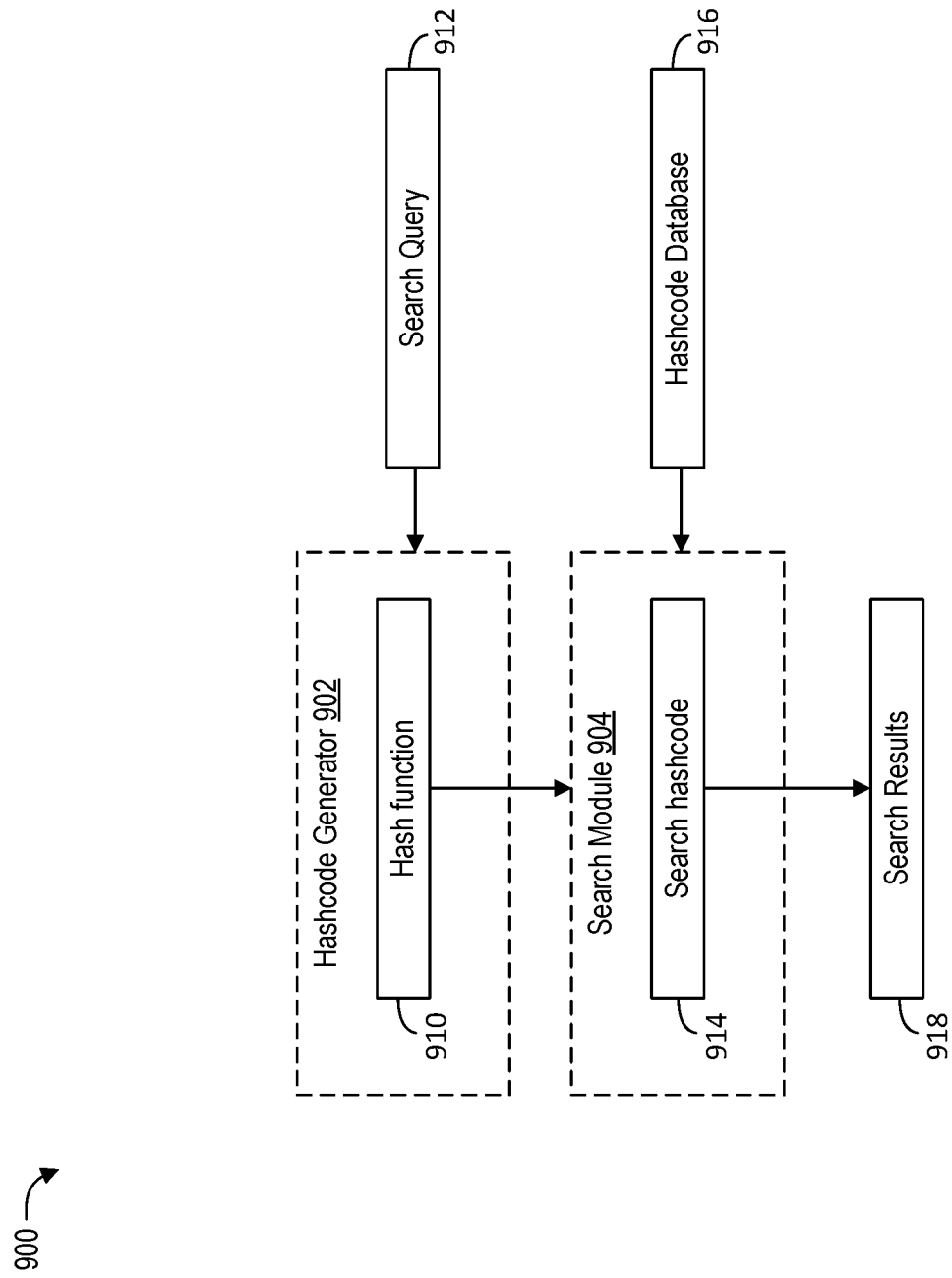
FIG. 9 is a schematic of a system for generating search results in an embodiment of the disclosed subject matter.

Referring to FIG. 9, FIG. 9 is a schematic of a system 900 for generating search results in an embodiment of the disclosed subject matter. The system 900 may be used to perform searches of text based on technical criteria. The system 900 may include a hashcode generator 902 and a search module 904.

The hashcode generator 902 may create a search hashcode 914 from a search query 912 with a hash function 910. The search query 912 may be one or more terms to be searched in a document repository 704. In various embodiments, the search query 912 may be a request to search a document repository 704 based on technical criteria. The search hashcode 914, produced by the hashcode generator 902, may categorize the search query 912 based on semantic text patterns.

The search module 904 may create search results 918 based on a comparison of the search hashcode 914 and a hashcode database 916. The hashcode database 916 may be an aggregate hashcode of multiple hashcodes of documents in a document repository 524. In an exemplary embodiment, the search results 918 may be the values of the search hashcode 914 that matched the values of the hashcode database 916.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

It is to be understood that teachings recited herein are not limited to a computing environment. Rather, embodiments of the present invention are capable of being implemented in conjunction with any other type of computing environment now known or later developed.

Detailed embodiments of the claimed structures and methods are disclosed; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete, and will fully convey the scope of this invention to those skilled in the art. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of embodiments of the present invention, in the detailed description above, some processing steps or operations that are known in the art may have been combined together for presentation and for illustration purposes and in some instances may have not been described in detail. In other instances, some processing steps or operations that are known in the art may not be described at all.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for technical language processing, the method comprising:
    constructing one or more base hash functions for generating hashcodes that represent semantic content of technical text;
    accessing one or more lexicons describing technical terminology;
    utilizing the one or more lexicons to create one or more customized hash functions from the one or more base hash functions to generate hashcodes that more accurately represent a semantic content of the technical terminology in the one or more lexicons compared to the base hash functions; and
    wherein the utilizing comprises optimizing the one or more customized hash functions to minimize a difference between hashcodes, generated by the one or more customized hash functions, for the semantic content of technical text and for the one or more lexicons.

2. The computer-implemented method of claim 1, further comprising:
    parsing documents in a technical document repository into syntactic elements;
    utilizing the one or more of the customized hash functions to generate hashcodes for the syntactic elements and storing the hashcodes for the syntactic elements in a hashcode database;
    accessing a search query; and
    utilizing the one or more customized hash functions to generate a search hashcode for the search query.

3. The computer-implemented method of claim 2, further comprising:
    correlating the search hashcode with the hashcode database and determining one or more search results.

4. The computer-implemented method of claim 3, further comprising:
    displaying the one or more search results.

5. The computer-implemented method of claim 3, further comprising:
    modifying the customized hash functions utilizing user feedback on the one or more search results.

6. The computer-implemented method of claim 2, further comprising:
    concatenating the hashcodes for the syntactic elements to generate an aggregate hashcode.

7. The computer-implemented method of claim 2, further comprising:
    using one or more computer translation tools to translate document repositories.

8. The computer-implemented method of claim 1, wherein the optimizing comprises iteratively generating the one or more customized hash functions.

9. The computer-implemented method of claim 8, wherein the optimizing further comprises uses a machine learning algorithm.

10. A computer-implemented method for searching a technical documents repository, the method comprising:
    constructing one or more base hash functions for generating hashcodes that represent semantic content of technical text;
    parsing documents in the technical document repository into syntactic elements;
    utilizing the one or more base hash functions to generate hashcodes for the syntactic elements and storing the hashcodes in a hashcode database;
    accessing a search query;
    utilizing the one or more base hash functions to generate a search hashcode for the search query;
    correlating the search hashcode with the hashcode database and determining one or more search results;
    accessing one or more lexicons describing technical terminology;
    utilizing the one or more lexicons to create one or more customized hash functions from the one or more base hash functions to generate hashcodes that more accurately represent a semantic content of the technical terminology in the one or more lexicons compared to the base hash functions; and
    wherein the utilizing comprises optimizing the one or more customized hash functions to minimize a difference between hashcodes, generated by the one or more customized hash functions, for the semantic content of technical text and for the one or more lexicons.

11. The method of claim 10, further comprising:
    displaying the one or more search results.

12. The method of claim 10, further comprising:
    concatenating the hashcodes generated by the one or more of the customized hash functions to generate an aggregate hashcode.

13. The method of claim 10, further comprising:
    modifying the one or more customized hash functions utilizing user feedback on the one or more search results.

14. The method in claim 10, further comprising:
    using one or more computer translation tools to translate document repositories.

15. A computer-program product for searching a technical documents repository, the computer program product comprising:
    one or more non-transitory computer-readable storage media and program instructions stored on the one or more non-transitory computer-readable storage media capable of performing a method, the method comprising:
    constructing one or more base hash functions for generating hashcodes that represent semantic content of technical text;

parsing documents in the technical document repository into syntactic elements;
utilizing the one or more base hash functions to generate hashcodes of the syntactic elements and storing the hashcodes in a hashcode database;
accessing a search query;
utilizing the one or more base hash functions to generate a search hashcode for the search query;
correlating the search hashcode with the hashcode database and determining one or more search results;
accessing one or more lexicons describing technical terminology;
utilizing the one or more lexicons to create one or more customized hash functions from the one or more base hash functions to generate hashcodes that more accurately represent a semantic content of the technical terminology in the one or more lexicons compared to the base hash functions; and
wherein the utilizing comprises optimizing the one or more customized hash functions to minimize a difference between hashcodes, generated by the one or more customized hash functions, for the semantic content of technical text and for the one or more lexicons.

16. The computer-program product of claim 15, the method further comprising:
displaying the one or more search results.

17. The computer-program product of claim 15, the method further comprising:
concatenating the hashcodes generated by the one or more customized hash functions to generate an aggregate hashcode.

18. The computer-program product of claim 15, the method further comprising:
collecting user feedback on the one or more search results; and
modifying the customized hash functions based on the user feedback.

19. The computer-program product of claim 15, the method further comprising:
using one or more computer translation tools to translate document repositories.

20. The computer-program product of claim 15, further comprising:
One or more computer processors capable of executing the program instructions stored on the one or more computer-readable storage media.

* * * * *